Figure 1:
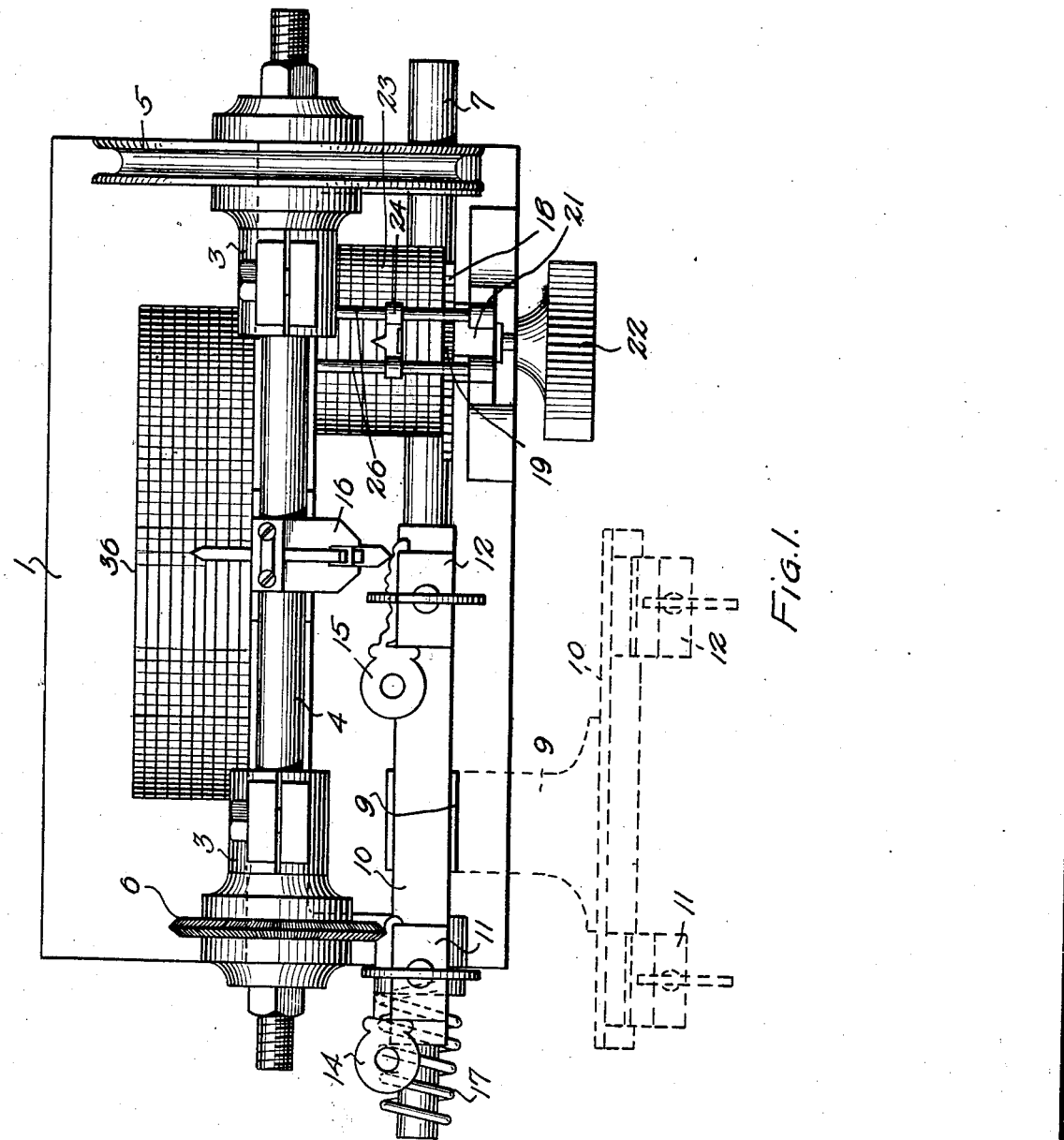

Sept. 16, 1930.　　　B. S. WILLIAMS　　　1,775,921
KEY CUTTING MACHINE
Filed July 3, 1928　　　4 Sheets-Sheet 2
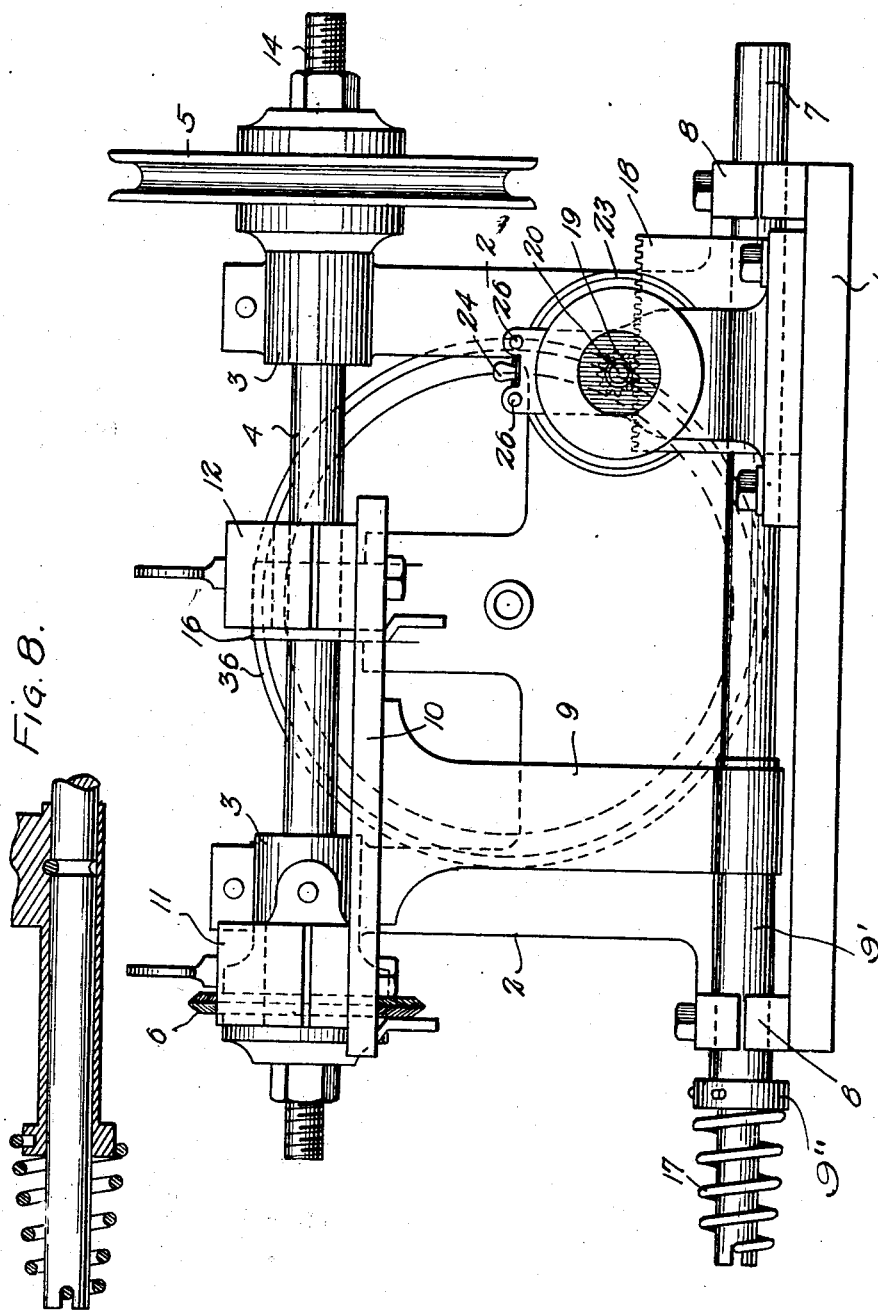
INVENTOR.
B. S. WILLIAMS.
BY
ATTORNEY.

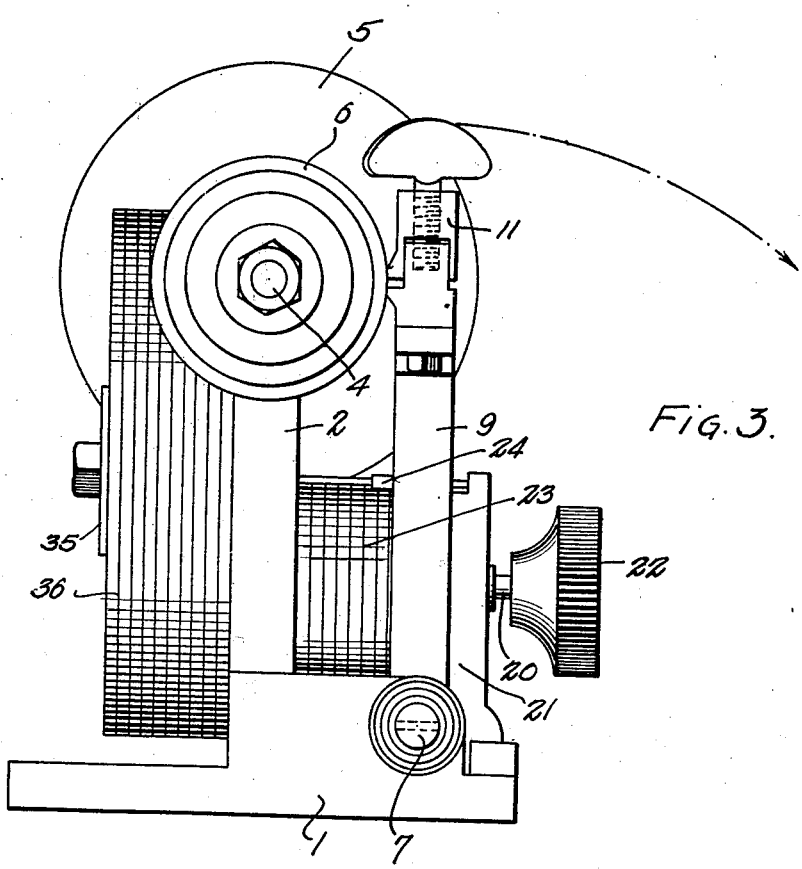
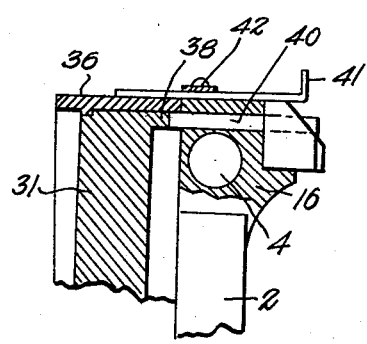

Sept. 16, 1930.  B. S. WILLIAMS  1,775,921
KEY CUTTING MACHINE
Filed July 3, 1928   4 Sheets-Sheet 4
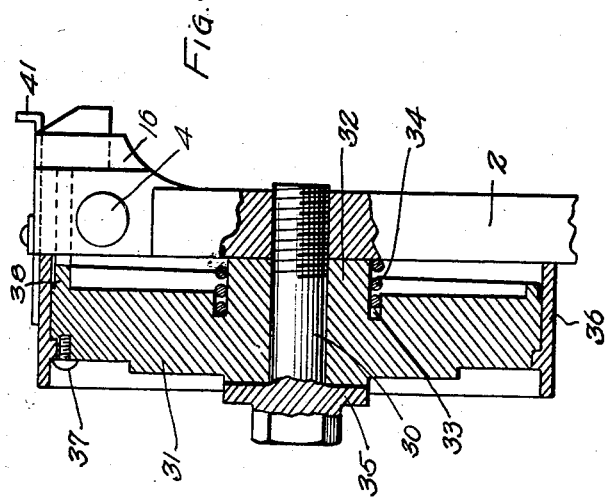
INVENTOR.
B. S. WILLIAMS.
BY Ralph J. Barrett
ATTORNEY.

Patented Sept. 16, 1930

1,775,921

UNITED STATES PATENT OFFICE

BENJAMIN S. WILLIAMS, OF NASHVILLE, TENNESSEE

KEY-CUTTING MACHINE

Application filed July 3, 1928. Serial No. 290,181.

The present apparatus is in the nature of improvements in key cutting machines of that type designed for duplication and comprehends additions the nature of which permit added operations heretofore unknown in the art.

Keys are recorded by numbers and letters, the numbers referring to the depth of the different cuts in the keys which co-act with pin tumblers and the letters refer to the make and class of key.

With the foregoing in mind it will be obvious to one skilled in the art that a chart can readily be prepared of such a character as to indicate the nature of the cuts forming the working face of each key. The present assembly has taken advantage of this condition and has adapted mechanism to control the work holder of a key cutting machine, which mechanism embodies drum dials with pointers whereby the control mechanism may be adjusted as desired to cause predetermined cuts and consequently the formation of any desired key.

More specifically, this apparatus comprehends a key cutting machine of that type having a hinged longitudinally movable work holder, and provides for the longitudinal movement of the work holder and also the lateral movement on its hinges under mechanism including drum dials, the movement of which control the parts.

Other features are present such as the adjustment of parts to compensate for wear, the arrangement of the elements to avoid interference with the normal operation or duplication of the machine, and the like.

Reference will be had to the accompanying drawings forming a part of this specification, in which:

Fig. 1 is a top plan;
Fig. 2 is a side elevation;
Fig. 3 is an end view;
Fig. 4 is a section showing the rear dial and co-acting parts;
Fig. 5 is a vertical section showing the rear dial and its mounting;
Fig. 6 is a top plan of the front dial; and
Fig. 7 is a spread plan of the rear dial showing the cam.

Fig. 8 is a side elevation, partly in section, showing the mounting of the work standard 9.

The present machine includes the base 1, vertical standards 2 carrying the bearing 3 through which the shaft 4 extends. The shaft 4 is provided with fixed pulley 5 at one extremity and cutter 6 at the opposite extremity. The power to the pulley 5 may be supplied from any suitable source. The cutter and drive mechanism is conventional and detailed reference to the parts is not made.

The work holder includes a lower supporting rod or tube 7 arranged to slide in bearings 8 and being sufficiently free in the bearings to permit partial turning motion. The standard 9 is hinged to rod 7 by provision of a tube 9' which partially closes the rod 7 and terminates in the collar 9''. The collar 9'' is fixed to the rod by a coil spring, one extremity of which is fixed to the rod and the other extremity of which is fixed to the collar. By this arrangement the standard 9 is free to swing on the supporting rod 7 at all times and the spring normally retains the same in the vertical or working position. The upper extremity of the standard 9 supports a cross-plate 10.

The extremities of the plate 10 carry the key holders 11 and 12, the former during the normal operation of the machine holding the blank 14 to be formed and the latter holding the key 15 to be duplicated. The usual guide 16 is employed to cause the lateral movement of the work holder as is customary in the art. A coiled spring 17 normally causes the engagement of the work and the cutter. The spring 17 may be adjusted to vary the tension, and action of the cutter.

In connection with the control for the longitudinal movement of the work holder, attention is directed primarily to Figure 1 in which a rack 18 is shown fixed to the supporting rod 7 carrying the work holders. This rack extends longitudinally of the rod 7 and is designed to mesh with the pinion 19 fixed to shaft 20, supported in suitable bearing 21 and actuated by means of the knob 22. A drum 23 is likewise fixed to the shaft 20 and is provided circumferentially with the names of the various standard keys and indices of the key structure, as will more clearly hereinafter appear and as is clearly illustrated in Fig. 6.

A pointer 24 is mounted to slide on the guide rods 26 to facilitate the use of the drum dial.

By turning the handle 22 the pinion 19 will cause the longitudinal movement of the work holder and this movement is gauged by the data arranged on the dial. The pointer 24 is adjusted on its supports to register with the name of the key to be cut and the work holder is then turned to cause the registration of the stops on the dial with the pointer which automatically positions the parts for proper spacing of the cuts.

The spacing of the parts being thus accomplished, the depth of the desired cuts is provided for by the following assembly:

A stud 30 is threaded into the frame and upon this stud is mounted the drum 31 formed with central hub portion 32. An annular groove 33 is formed on the inner face of the drum 31 and in this groove 33 seats one end of the coiled spring 34. The opposite end of the spring engages the adjacent face of the frame and provides the necessary frictional action between the parts. An enlarged disc 35 is formed integral with the head of the stud and the inner face of this disc engages and forms a bearing surface for engagement with the adjacent axial drum face.

A cylindrical dial 36 is fixed to the peripheral face of the drum 31 by means of screws 37. A detail plan of this dial 36 showing the arrangement of the data will be seen in Figure 7. This figure also illustrates the provision of the annular cam 38 at the peripheral inner face of the drum which cam engages the sliding pin 40 (see Fig. 4). This pin 40 is arranged to engage the key holder at the part 12 and cause a lateral movement of same according to the pitch of the cam face. A pointer 41 slides in the guideway 42 and facilitates the reading and operation of the parts.

From the foregoing it will be seen that the assembly has provided a machine for cutting keys either by duplication or code numbers and letters. The code numbers and letters being provided on dials so fixed that their actuation will result in the accurate gauging of the cutting operations, both as to depth and spacing. In the making of a key from code numbers and letters, I have a series of charts divided into groups, each group being indicated by serial letters and numbers, each depth regulated by the number of this particular pin tumbler, which vary in the different makes of locks and codes. By being provided with these codes this machine can be set to cut a key that will operate a lock set up with a specific number.

What I claim as new and useful and desire to secure by Letters Patent is:

1. In a key cutting machine, a cutting element, a swinging work holder, means for moving said work holder longitudinally, means for moving said work holder transversely including a cam, a movable element engaging said cam and said work holder and a dial carried by said cam.

2. The substance of claim 1 characterized in that the movable element engaging the cam and work holder is in the nature of a slide.

3. The substance of claim 1 characterized in that the movable element engaging the cam and work holder is a slide positioned beneath a pointer, the latter operating in connection with a dial fixed to said cam.

4. In a key cutting machine, a cutting element, a longitudinally movable hinged work holder, means for normally retaining said work holder in operating position, manually actuated means for moving said work holder longitudinally, a dial carried by said actuating means, an indicator for said dial, means for controlling the movement of said work holder on its hinges, a dial carried by the last mentioned controlling means, an indicator for use in connection with said dial, and means for adjusting said dial.

5. In a key cutting machine including a frame, a cutting element, a hinged work holder, means for moving said work holder longitudinally comprising a rack, a pinion meshing with said rack keyed to a rotatable shaft, a drum dial fixed to said shaft, parallel guide rods arranged above and transversely of said drum dial, an indicator slidably mounted on said guide rods and co-acting with said drum dial, and means for regulating the movement of said work holder on its hinges.

6. The substance of claim 5 characterized in that the means for regulating the movement of said work holder on its hinges includes a cam, and a connecting element between said cam and work holder.

7. The substance of claim 5 characterized in that the means for regulating the movement of said work holder on its hinges includes an adjustable cam, a dial for said cam, and an indicator for said dial.

8. In a key cutting machine including a frame, a cutting element, a hinged work holder, means for moving said work holder longitudinally comprising a rack, a pinion meshing with said rack keyed to a rotatable shaft, a drum dial fixed to said shaft, parallel guide rods arranged above and transversely of said drum dial, an indicator slidably mounted on said guide rods and co-acting with said drum dial, and means for regulating the movement of said work holder on its hinges, including a stud threaded into said frame, a drum mounted on said stud having an irregular surface, a dial carried by said drum, an indicator for said dial, and means for adjusting said dial.

9. The substance of claim 8 characterized in that the indicator for the last mentioned dial is mounted on the frame and is adjustable with relation to the dial.

10. In a key cutting machine, including a frame, a cutting element, a hinged longitudinally sliding work holder, and means for controlling the movement of said work holder on its hinges including an adjustable stud extending into said frame, a cam rotatably mounted on said stud, and spring means for retaining said cam in fixed position.

11. The substance of claim 10 characterized in that the cam which is adjustably mounted on the stud screwed into the frame is provided with a peripheral drum dial for use in conjunction with an indicator carried by the frame.

In testimony whereof I affix my signature.

BENJAMIN S. WILLIAMS.